US012768437B2

(12) United States Patent
Henry

(10) Patent No.: US 12,768,437 B2
(45) Date of Patent: Oct. 20, 2026

(54) DAMAGE DETECTION FOR AIRCRAFT PARTS

(71) Applicant: Textron Innovations Inc., Providence, RI (US)

(72) Inventor: Tyson Henry, Arlington, TX (US)

(73) Assignee: Textron Innovations Inc., Providence, RI (US)

( * ) Notice: Subject to any disclaimer, the term of this patent is extended or adjusted under 35 U.S.C. 154(b) by 0 days.

(21) Appl. No.: 19/019,956

(22) Filed: Jan. 14, 2025

(65) Prior Publication Data

US 2026/0201945 A1 Jul. 16, 2026

(51) Int. Cl.

*G08B 21/00* (2006.01)
*B64D 35/00* (2006.01)
*F16H 57/01* (2012.01)
*B64D 45/00* (2006.01)

(52) U.S. Cl.

CPC ............ *F16H 57/01* (2013.01); *B64D 35/00* (2013.01); *B64D 2045/0085* (2013.01); *F16H 2057/012* (2013.01)

(58) Field of Classification Search

CPC ... F16H 57/01; F16H 2057/012; B64D 35/00; B64D 2045/0085

See application file for complete search history.

(56) References Cited

U.S. PATENT DOCUMENTS

| | | | | |
|---|---|---|---|---|
| 7,945,397 | B2 * | 5/2011 | Kar | G01M 13/021 702/34 |
| 9,501,820 | B2 * | 11/2016 | Nissen | H04N 23/56 |
| 10,359,346 | B1 * | 7/2019 | Murrell | G01L 5/00 |
| 10,753,893 | B2 * | 8/2020 | Harrington | G01N 25/00 |
| 12,434,854 | B2 * | 10/2025 | Morel | B64D 45/00 |

* cited by examiner

*Primary Examiner* — Toan N Pham

(74) *Attorney, Agent, or Firm* — Akona IP PC

(57) ABSTRACT

One embodiment is a rotorcraft including a rotor system, and a transmission system for providing rotational power to the rotor system. The transmission system includes a housing, and a planetary pinion gear disposed in the housing. The rotorcraft further includes a system for detecting damage includes a break wire embedded in the planetary pinion gear, the break wire configured to break when a crack develops in the planetary pinion gear and a radio frequency identification (RFID) tag for indicating breakage of the break wire to an RFID reader.

20 Claims, 9 Drawing Sheets

DAMAGE DETECTION FOR AIRCRAFT PARTS

TECHNICAL FIELD

This disclosure relates in general to the field of aircraft and, more particularly, though not exclusively, to techniques for detecting damage in aircraft parts, especially when such parts are disposed in areas of the aircraft, particularly rotorcraft, that are difficult to monitor.

BACKGROUND

Various rotorcraft, such as helicopters, may include one or more rotor systems. One example of a rotorcraft rotor system is a main rotor system. A main rotor system may generate aerodynamic lift to support the weight of the rotorcraft in flight and thrust to counteract aerodynamic drag and move the aircraft in forward flight. Another example of a rotorcraft rotor system is a tail rotor system. A tail rotor system may provide anti-torque and/or directional control for the rotorcraft.

Certain rotorcraft parts may have critical failure modes and must be monitored to avoid catastrophic failure of the rotorcraft. In some embodiments, such parts are in locations that are not easily accessible or that are moving and/or rotating. In such situations, it may be desirable to be able to monitor the health of the part without using a wired connection.

BRIEF DESCRIPTION OF THE DRAWINGS

To provide a more complete understanding of the present disclosure and features and advantages thereof, reference is made to the following description, taken in conjunction with the accompanying figures, in which like reference numerals represent like elements.

DETAILED DESCRIPTION

Figure 1:
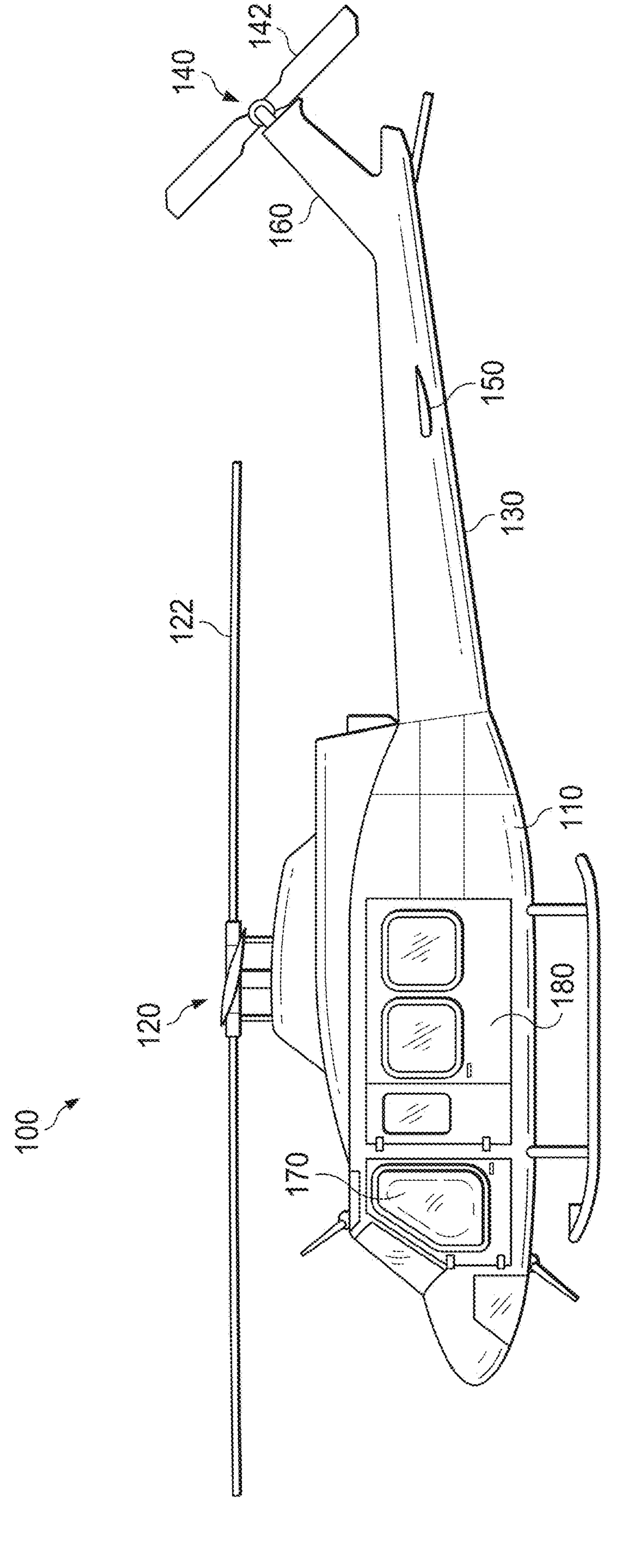
FIGS. 1 and 2 respectively illustrate a side plan view and a front plan view of an example rotorcraft in which embodiments described herein may be implemented.

The following disclosure describes various illustrative embodiments and examples for implementing the features and functionality of the present disclosure. While particular components, arrangements, and/or features are described below in connection with various example embodiments, these are merely examples used to simplify the present disclosure and are not intended to be limiting. It will of course be appreciated that in the development of any actual embodiment, numerous implementation-specific decisions must be made to achieve the developer's specific goals, including compliance with system, business, and/or legal constraints, which may vary from one implementation to another. Moreover, it will be appreciated that, while such a development effort might be complex and time-consuming; it would nevertheless be a routine undertaking for those of ordinary skill in the art having the benefit of this disclosure.

In the specification, reference may be made to the spatial relationships between various components and to the spatial orientation of various aspects of components as depicted in the attached drawings. However, as will be recognized by those skilled in the art after a complete reading of the present disclosure, the devices, components, members, apparatuses, etc. described herein may be positioned in any desired orientation. Thus, the use of terms such as "above", "below", "upper", "lower", "top", "bottom", or other similar terms to describe a spatial relationship between various components or to describe the spatial orientation of aspects of such components, should be understood to describe a relative relationship between the components or a spatial orientation of aspects of such components, respectively, as the components described herein may be oriented in any desired direction. When used to describe a range of dimensions or other characteristics (e.g., time, pressure, temperature, length, width, etc.) of an element, operations, and/or conditions, the phrase "between X and Y" represents a range that includes X and Y.

Additionally, as referred to herein in this specification, the terms "forward," "aft," "inboard," and "outboard" may be used to describe relative relationship(s) between components and/or spatial orientation of aspect(s) of a component or components. The term "forward" may refer to a spatial direction that is closer to a front of an aircraft relative to another component or component aspect(s). The term "aft" may refer to a spatial direction that is closer to a rear of an aircraft relative to another component or component aspect(s). The term "inboard" may refer to a location of a component that is within the fuselage of an aircraft and/or a spatial direction that is closer to or along a centerline of the aircraft (wherein the centerline runs between the front and the rear of the aircraft) or other point of reference relative to another component or component aspect. The term "outboard" may refer to a location of a component that is outside the fuselage of an aircraft and/or a spatial direction that is farther from the centerline of the aircraft or other point of reference relative to another component or component aspect.

Further, the present disclosure may repeat reference numerals and/or letters in the various examples. This repetition is for the purpose of simplicity and clarity and does not in itself dictate a relationship between the various embodiments and/or configurations discussed. Example embodiments that may be used to implement the features and functionality of this disclosure will now be described with more particular reference to the accompanying figures.

Figure 2:
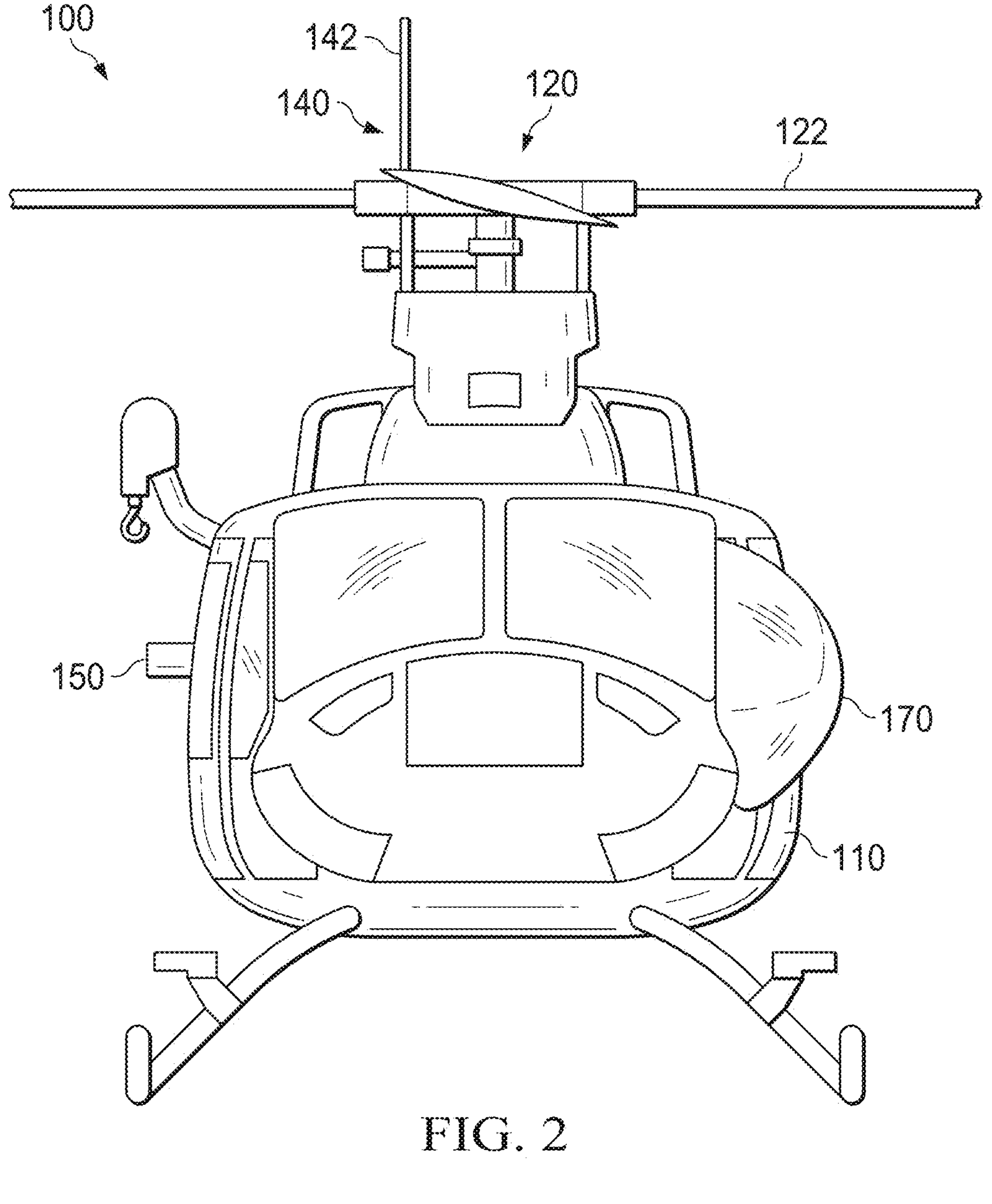

FIGS. 1 and 2 respectively illustrate side and front plan views of an example embodiment of a rotorcraft 100 in which embodiments described herein may be implemented. Rotorcraft 100 includes a fuselage 110, a rotor system (also alternatively referred to as a main rotor system) 120 comprising a plurality of rotating rotor blades 122, and an empennage 130. The fuselage 110 is the main body of the rotorcraft, which may include a cabin or cockpit for the crew, passengers, and/or cargo, and may also house certain mechanical and electrical components, such as one or more engines, transmission systems, and flight controls. The rotor system 120 is used to generate lift for the rotorcraft through rotation of rotor blades 122. For example, torque generated by the engine(s) causes the rotor blades 122 to rotate, which in turn generates lift. Moreover, the pitch of each rotor blade 122 can be adjusted in order to selectively control direction, thrust, and lift for the rotorcraft 100. The empennage 130 is the tail assembly of the rotorcraft. In the illustrated embodiment, the empennage 130 includes a tail rotor system 140, which may be used to provide anti-torque and/or directional control for the rotorcraft 100 using a plurality of rotating rotor blades 142. For example, torque generated by the engine(s) causes the rotor blades 142 to rotate, which in turn provides anti-torque and/or directional control. Blades 142 may provide thrust in the same direction as the rotation of blades 122 so as to counter the torque effect created by rotor system 120 and blades 122. Teachings of certain embodiments recognize that blades 142 may represent one example of a secondary rotor system. Other examples may include, but are not limited to, forward-thrust propellers (e.g., pusher propellers, tractor propellers, etc.), tail anti-torque propellers, ducted rotors, and ducted and mounted inside and/or outside the rotorcraft 100.

In the illustrated embodiment, the empennage 130 also includes a horizontal stabilizer 150 and a vertical stabilizer 160. In general, a stabilizer is an aerodynamic surface or airfoil that produces an aerodynamic lifting force (either positive or negative). For example, a stabilizer may be a fixed or adjustable structure with an airfoil shape and may also include one or more movable control surfaces. The primary purpose of a stabilizer is to improve stability about a particular axis (e.g., pitch or yaw stability), although a stabilizer can also provide other secondary aerodynamic benefits.

A horizontal stabilizer (e.g., horizontal stabilizer 150) is primarily used to provide stability in pitch, or longitudinal stability. For example, both the rotor and fuselage of a rotorcraft typically have an inherent negative stability derivative in pitch, and accordingly, a horizontal stabilizer may be used to neutralize pitch instability and improve the overall handling qualities of the rotorcraft. A horizontal stabilizer may also be used to generate lift for a rotorcraft, for example, to aid in climb or ascent. In some cases, a horizontal stabilizer may also include one or more movable control surfaces, such as an adjustable slat to aid in generating lift. The design of a horizontal stabilizer (e.g., airfoil shape, size, position on a rotorcraft, control surfaces) implicates numerous performance considerations and is often an extremely challenging aspect of aircraft design.

A vertical stabilizer (e.g., vertical stabilizer 160) is primarily used to provide stability in yaw, or directional stability. Although considerable yaw stability and control is often provided by a tail rotor, a vertical stabilizer may be used to supplement the performance of the tail rotor and/or reduce the performance requirements of the tail rotor. Accordingly, designing a vertical stabilizer and a tail rotor often implicates numerous interrelated performance considerations, particularly due to the interaction between their respective airflows. For example, a smaller vertical stabilizer may reduce the adverse effects on tail rotor efficiency but may adversely impact yaw stability and other design requirements (e.g., sideward flight performance, internal capacity for housing components within the vertical stabilizer). Accordingly, various performance considerations must be carefully balanced when designing a vertical stabilizer.

It will be recognized that various embodiments of horizontal and vertical stabilizers with designs that balance a variety of performance considerations to provide optimal performance may be provided. For example, certain embodiments of a horizontal stabilizer may be designed to provide strong aerodynamic performance (e.g., pitch stability and/or generating sufficient lift during climb or ascent) without using slats. Such a horizontal stabilizer may use a tailored airfoil design that is cambered and may form a concave slope on the top surface and/or a convex slope on the bottom surface. In some embodiments, the horizontal stabilizer may be mounted on the aft end of a rotorcraft. By obviating the need for slats, such a horizontal stabilizer design reduces complexity without a performance penalty, thus resulting in a more cost-efficient and reliable solution. Moreover, eliminating the slats similarly eliminates the need to provide anti-icing for the slats, thus providing a further reduction in complexity.

Moreover, certain embodiments of a vertical stabilizer may be designed to provide strong aerodynamic performance. Such a vertical stabilizer may use a tailored airfoil design that satisfies various design criteria, including strong aerodynamic performance (e.g., yaw stability, anti-torque control, minimal flow separation and drag). In some embodiments, for example, the vertical stabilizer may have a cambered airfoil shape that provides the requisite yaw stability and anti-torque control while also minimizing flow separation and drag. The cambered airfoil shape, for example, may enable the vertical stabilizer to provide a portion of the anti-torque required in forward flight (e.g., reducing the anti-torque requirements and power consumption of the tail rotor), and/or may also provide sufficient anti-torque to allow continued flight in the event of a tail rotor failure. The cambered airfoil shape may also enable the vertical stabilizer to provide sufficient aerodynamic sideforce to offset the tail rotor thrust in forward flight, thus minimizing tail rotor flapping and cyclic loads and maximizing the fatigue life of components. Moreover, in some embodiments, the vertical stabilizer may have a blunt trailing edge (rather than a pointed trailing edge) in order to reduce the thickness tapering on the aft end without modifying the desired chord length, thus minimizing flow separation and drag while also reducing manufacturing complexity.

It should be appreciated that rotorcraft 100 shown in FIGS. 1 and 2 is merely illustrative of a variety of aircraft that can be used with embodiments described throughout this disclosure. Other aircraft implementations can include, for example, fixed wing airplanes, hybrid aircraft, tiltrotor aircraft, unmanned aircraft, gyrocopters, a variety of helicopter configurations, and drones, among other examples. Additionally, while embodiments described herein are described with respect to aircraft, and particularly, rotorcraft, it will be appreciated that the teachings herein may be applied to parts of interest included in other types of vehicles and/or machines as may be deemed appropriate.

Teachings of certain embodiments relating to rotor systems described herein may apply to rotor system 120 and/or other rotor systems, such as tiltrotor and helicopter rotor systems. It should be appreciated that teachings from rotorcraft 100 may apply to aircraft other than rotorcraft, such as airplanes and unmanned aircraft, to name a few examples. In some embodiments, rotorcraft 100 may include a variety of additional components not shown in FIGS. 1 and 2. For example, rotor system 120 may include components such as a power train, drive shafts, a hub, a swash plate, and pitch links.

In the example illustrated in FIGS. 1 and 2, power may be provided from the engines to main rotor blades 122 and tail rotor blades 142 through a combination of drive shafts, gearboxes (e.g., transmission systems or simply "transmissions") and other components. In some example embodiments, engines provide power through a main rotor gearbox to a rotating mast in mechanical communication with rotor blades 122. In addition, a drive shaft may provide power to a secondary rotor gearbox (e.g., a 90-degree gearbox), which may transit power to rotor blades 142. In these example embodiments, main rotor gearbox may be proximate the fuselage 110, secondary rotor gearbox may be proximate the empennage 130, and drive shaft may be proximate the fuselage and/or the empennage (e.g., extending from the main rotor gearbox to secondary rotor gearbox).

A pilot may manipulate one or more pilot flight controls in order to achieve controlled aerodynamic flight of the rotorcraft 100. Inputs provided by the pilot-to-pilot flight controls may be transmitted mechanically and/or electronically (e.g., via a fly-by-wire flight control system) to flight control devices. Flight control devices may represent devices operative to change the flight characteristics of the aircraft. Examples of flight control devices on rotorcraft 100 may include a control system operable to change the positions of blades 122 and/or 142.

Rotorcraft typically include three sets of pilot flight controls, including cyclic control, collective control, and pedal (for directional) control. Other pilot flight controls may include power control and thrust control. In general, cyclic pilot flight controls may allow a pilot to impart cyclic motions on blades 122 to cause the rotorcraft 100 to tilt in a direction specified by the pilot. For tilting forward and back (pitch) and/or sideways (roll), the angle of attack of blades 122 may be altered cyclically during rotation, creating different amounts of lift at different points in the cycle.

Collective pilot flight controls may allow a pilot to impart collective motions on blades 122 to change the overall lift produced by the blades. For increasing or decreasing overall lift in blades 122, the angle of attack for all blades may be collectively altered by equal amounts at the same time, resulting in ascents, descents, acceleration, and/or deceleration.

Anti-torque pilot flight controls may allow a pilot to change the amount of anti-torque force applied to the rotorcraft 100. As noted above, blades 142 may provide thrust in the same direction as the rotation of the blades 122 so as to counter the torque effect created by the rotor system 120 and blades 122. Anti-torque pilot flight controls may change the amount of anti-torque force applied to change the heading of rotorcraft 100. In some embodiments, anti-torque pilot flight controls may change the amount of anti-torque force applied by changing the pitch of the blades 142, increasing or reducing the thrust produced by the blades 142, and causing the nose of the rotorcraft to yaw in the direction of the applied pedal. In some embodiments, the rotorcraft 100 may include additional or different anti-torque devise, such as a rudder or a NOTAR anti-torque device, and the anti-torque pilot flight controls may change the amount of force provide by the additional different anti-torque devices.

The components of rotor systems described herein may comprise any materials suitable for use with an aircraft rotor. For example, rotor blades and other components may comprise carbon fiber, fiberglass, or aluminum; and rotor masts and other components may comprise steel or titanium.

Main rotor and tail rotor flight control systems, including cyclic, collective, and anti-torque controls, may be used to regulate the attitude, altitude, and direction of flight of rotorcraft 100. In accordance with features of embodiments described herein, the flight controls are hydraulically boosted to reduce pilot effort in controlling the airport and to counteract control feedback forces.

Figure 3:
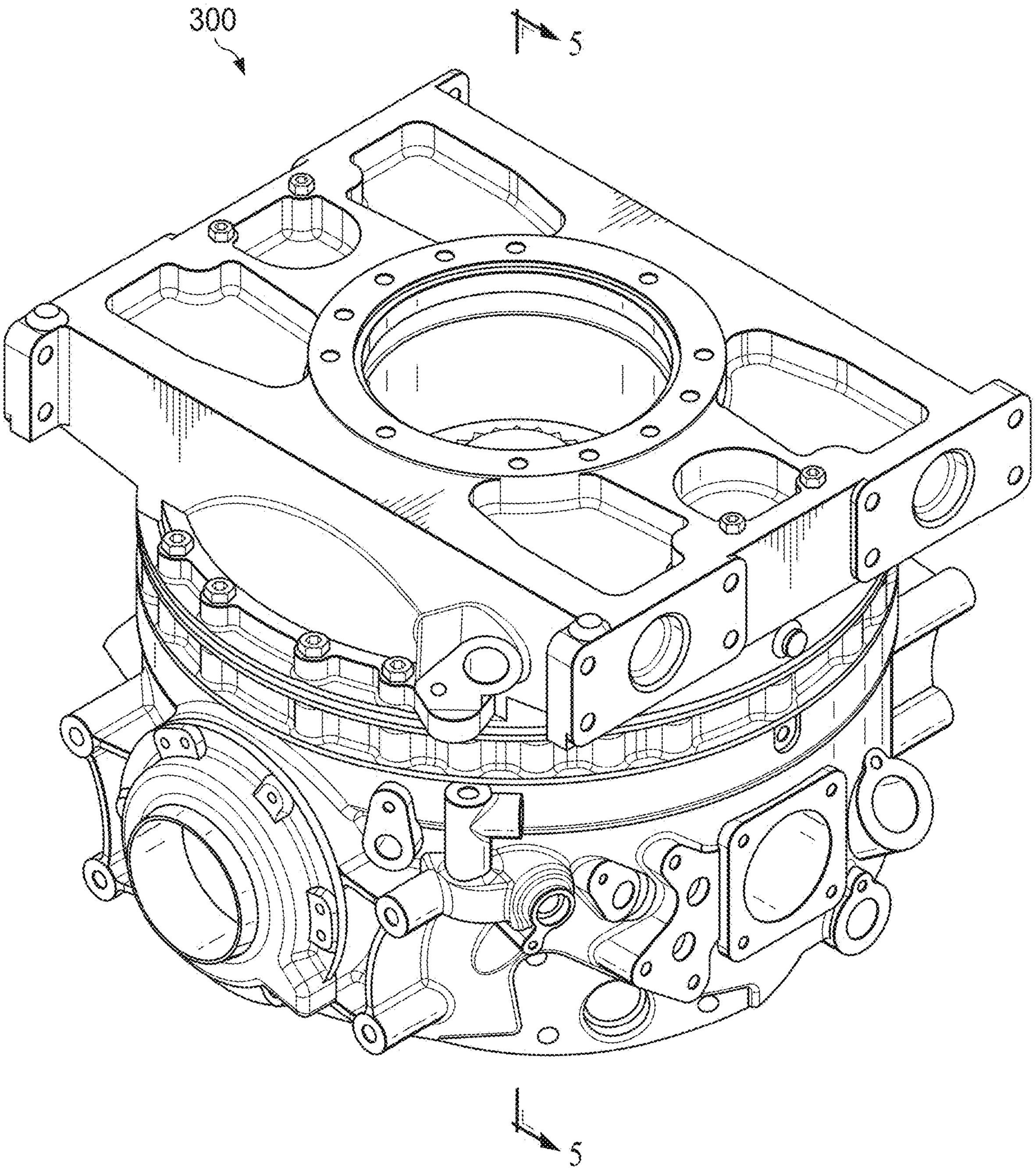
FIG. 3 is a perspective view of an example transmission that may be implemented in a drivetrain of the rotorcraft of FIGS. 1 and 2 in accordance with embodiments described herein.
Figure 4:
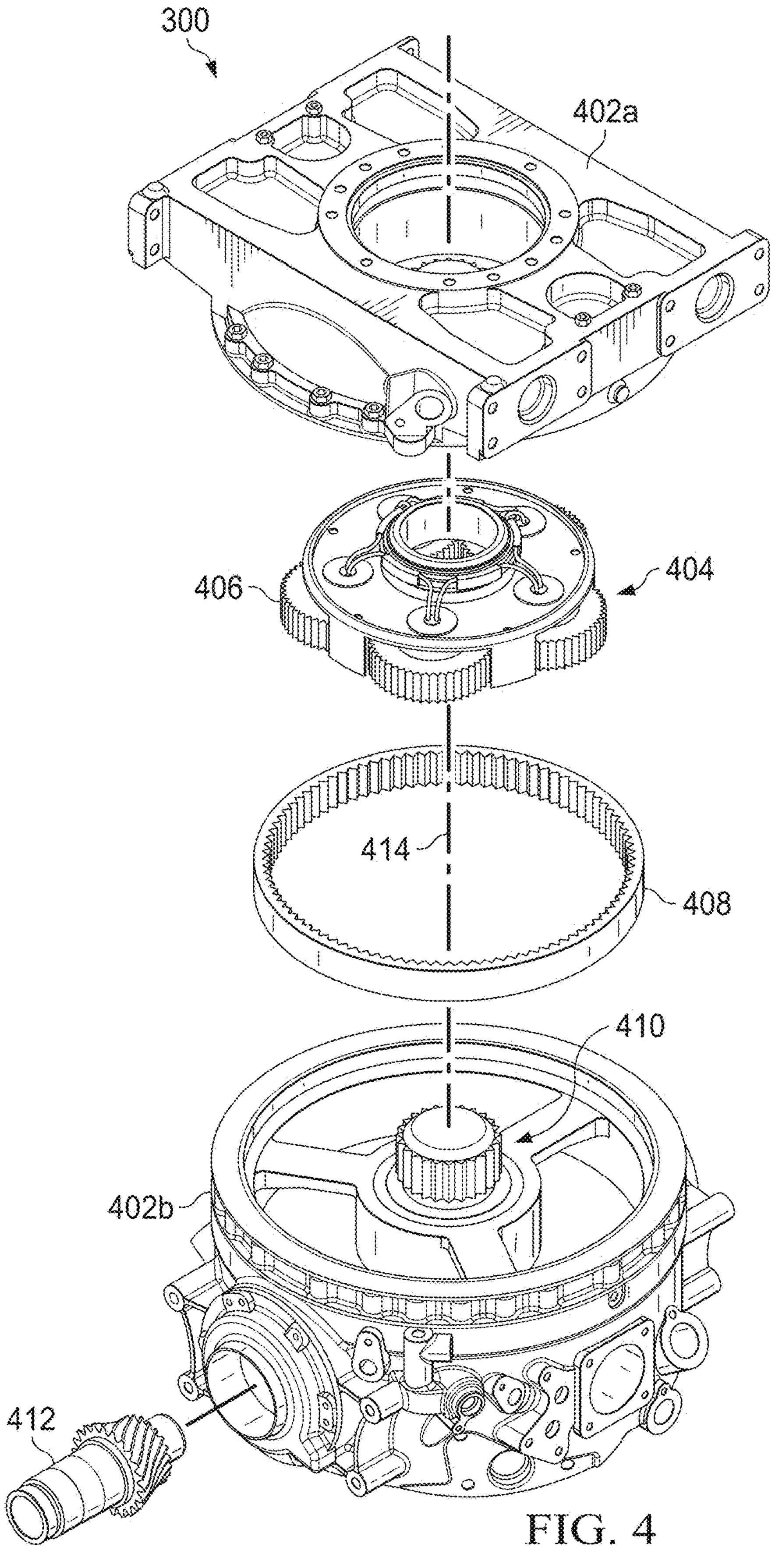
FIG. 4. is an exploded view of selected components of the example transmission of FIG. 3, including a planetary carrier assembly, in accordance with embodiments described herein.

FIG. 3 illustrates an isometric view of an example transmission 300 that may be used to implement one or more of the rotor systems of rotorcraft 100, such as main rotor system 120, for example. It will be recognized that while transmission 300 is a representative embodiment of a transmission that may be used to drive main rotor system 120, other styles and sized transmissions may also be used. FIG. 4 illustrates an exploded view of selected components within transmission 300. As shown in FIG. 4, transmission 300 includes an upper housing **402*a* and a lower housing 402*b* that couple together to form a single unitary housing configured to encompass internal components. Internal components may include at least a planetary carrier assembly 404 including planetary pinion gears 406, a planetary ring gear 408, a planetary sun gear 410, and an input shaft 412. Although described with specific internal components, it is understood that transmission 300 may function with and utilize any number of selected components other than those depicted and described. For simplicity, other internal components within transmission 300 are not depicted. It is understood that different embodiments of transmission 300 may utilize a plurality of planetary carrier assemblies 404. Lower housing 402*b*, planetary ring gear 408, planetary carrier assembly 404 and upper housing 402*a* are each configured to accept main rotor mast (not shown in FIGS. 3 and 4) therethrough along a vertical axis 414. It is understood that vertical axis 414 is not limited in orientation to that of being vertical. Other orientations are possible depending on the type of aircraft and power train configuration. Input shaft 412 is a portion of drive linkage interconnecting an engine (not shown in FIGS. 3-4) and transmission 300**.

Certain helicopter parts have critical failure modes that need to be monitored to avoid catastrophic failure during operation. In particular situations, these parts are disposed in locations that are not easily accessible, are moving and/or are rotating. In such cases, it may be desirable to be able to monitor the health of the part without using a wired connection directly attached to the part. For instance, a planetary pinion gear (such as planetary pinion gear 406) has rotational velocity in two different reference planes and therefore would be difficult to wire directly to. Additionally, a planetary pinion gear is located within a metal gearbox case, which does not allow for easy detection visually or by other means.

In accordance with features of embodiments described herein, a mechanism for monitoring damage to a part of interest, such as a planetary pinion gear, includes coupling a radio frequency identification (RFID) tag capable of wirelessly transmitting the status of a break wire integrated into a part of interest. RFID tags need neither built in power nor a direct connection and therefore allow status of a part of interest to be monitored regardless of whether the part is located. The RFID tag may be attached to or embedded in the part of interest and when broken, the break wire may either transmit a state via the RFID tag or render the RFID tag non-operational. The break wire may be positioned such that propagation of a crack in the part of interest in a direction of concern would break the wire. An RFID reader may be provided proximate to the part of interest for monitoring the status of the break wire via the RFID tag. The RFID reader may be further connected to a control system of the aircraft to alert the control system when the break wire is broken and the part of interest is damaged.

It will be recognized that embodiments described herein may be advantageously applied to with any part that is rotating or moving relative to another part, such as gears including but not limited to planetary gears, hub components, including but not limited to pitch links, pitch horns, swash plate, and the hub itself, and aircraft control surfaces.

Figure 5:
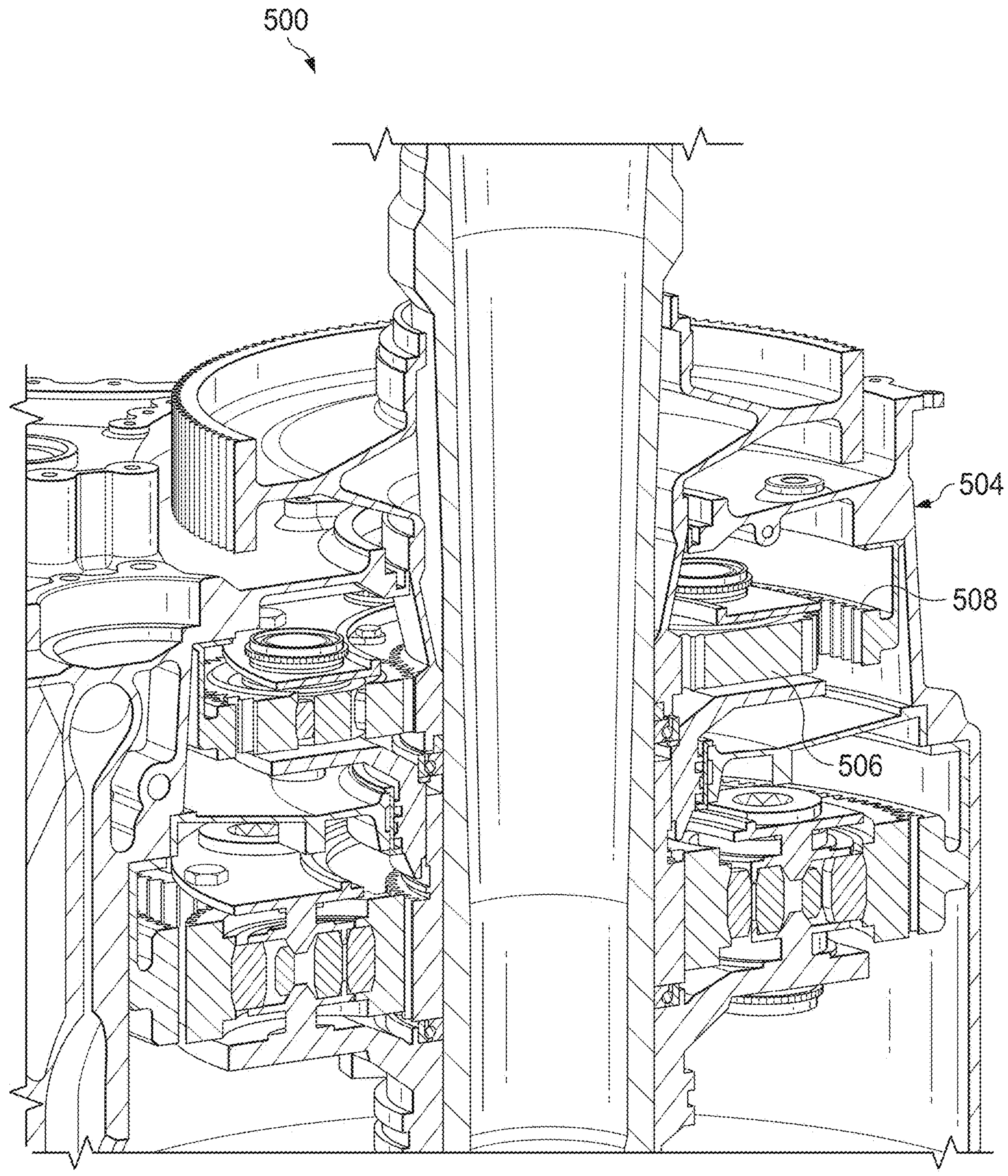
FIG. 5 is a cutaway view of another example transmission that may be implemented in a drivetrain of the rotorcraft of FIGS. 1 and 2 and including a system for detecting damage in an aircraft part in accordance with embodiments described herein.

FIG. 5 illustrates a cutaway view of another example transmission 500 that may be used to implement one or more of the rotor systems of rotorcraft 100, such as main rotor system 120, for example. It will be recognized that while transmission 500 is similar in all relevant respects to transmission 300 and will therefore only be described in the detail necessary to illustrate aspects of embodiments of detection mechanisms described herein. As shown in FIG. 5, transmission 500 includes a planetary carrier assembly 504 including planetary pinion gears 506 and a planetary ring gear 508.

Figure 6:
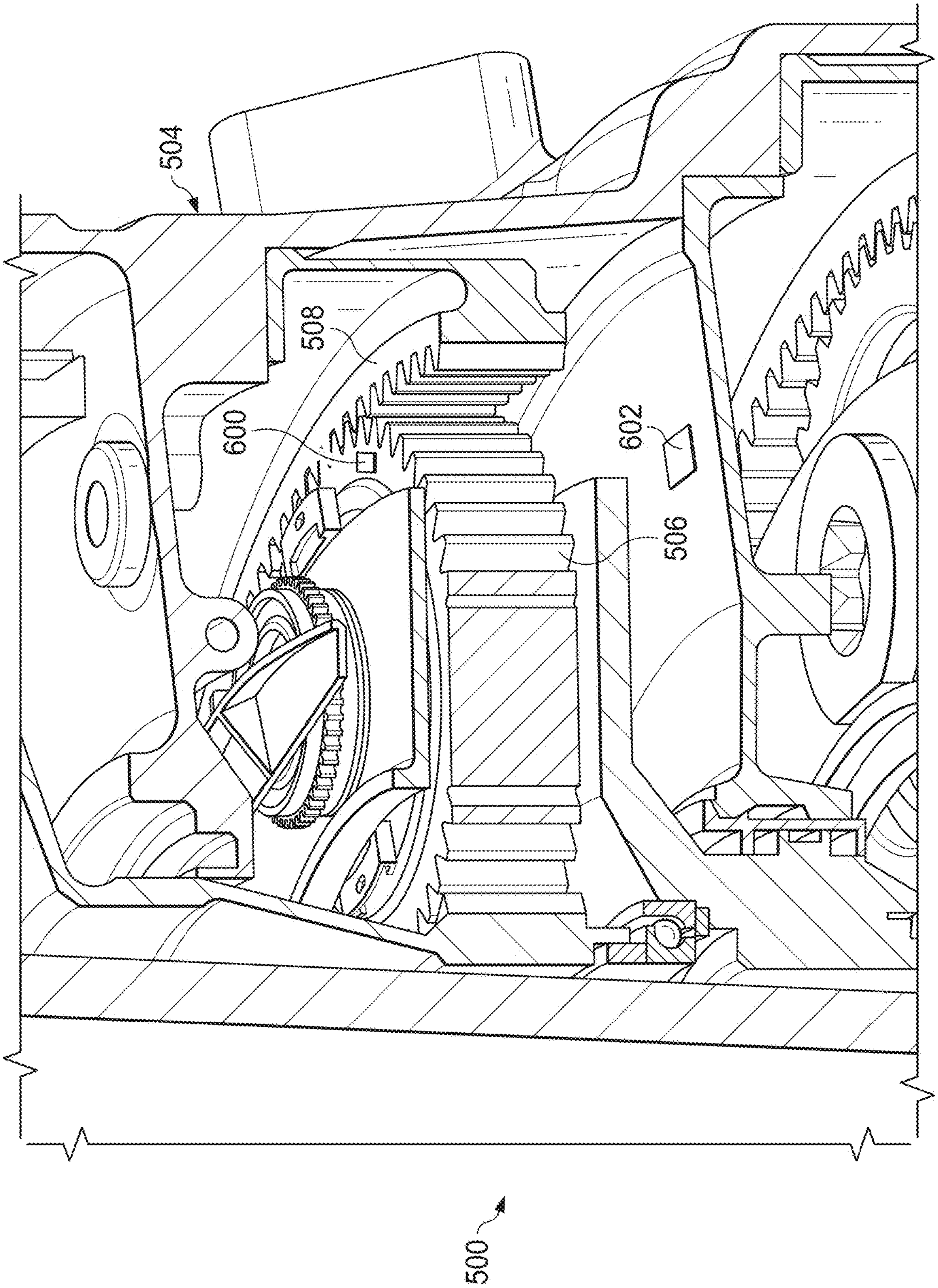
FIG. 6 is a more detailed view of a portion of the example transmission of FIG. 6.
Figure 7:
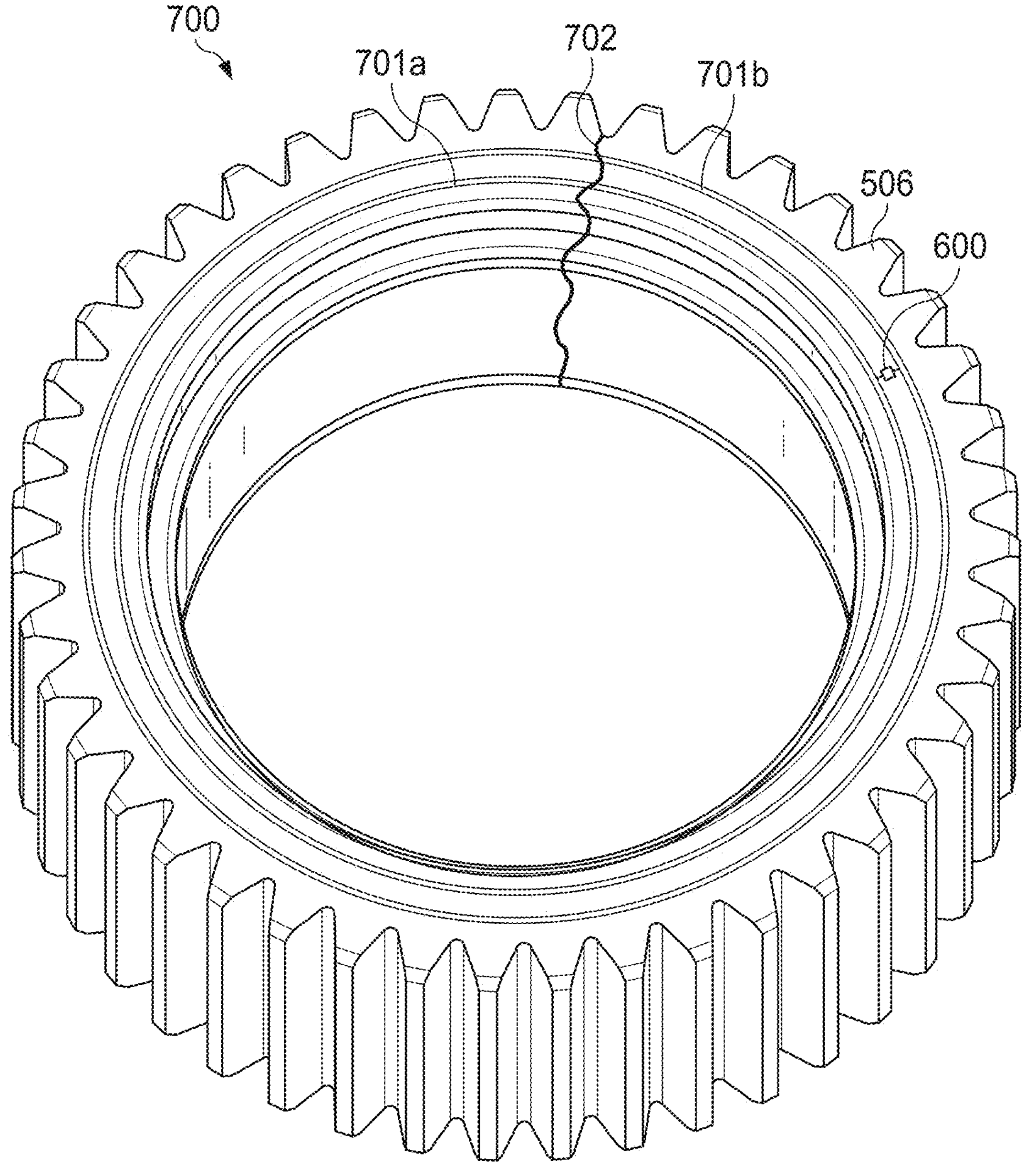
FIG. 7 is perspective view of an aircraft part comprising a planetary pinion gear of the example transmission of FIG. 5 configured in accordance with embodiments described herein.

FIG. 6 illustrates a more detailed illustration of one of planetary pinion gears 506 comprising a part of interest for purposes of damage detection. In accordance with features of embodiments described herein and as will be described in greater detail below, a system for monitoring damage to planetary pinion gear 506 is provided and includes an RFID tag 600 is associated with (e.g., embedded in or attached to) planetary pinion gear 506 and an RFID reader 602 is provided proximate planetary pinion gear 506 for reading signals from RFID tag 600. As best shown in FIG. 7, a break wire system 700, which in the illustrated embodiment comprises a pair of break wires 701*a*, 701*b* (collectively 701), is embedded in planetary pinion gear 506 in such a manner that a failure of planetary pinion gear 506 in a manner represented by a break line 702, would result in breakage of the wires 701 comprising break wire system 700. In the illustrated embodiment, RFID tag 600 is embedded in planetary pinion gear 506 and connected between break wires 701 of break wire system 700 such that breakage of the wires may be detected by RFID tag 600 and signaled to RFID reader 602 (FIG. 6).

Figure 8:
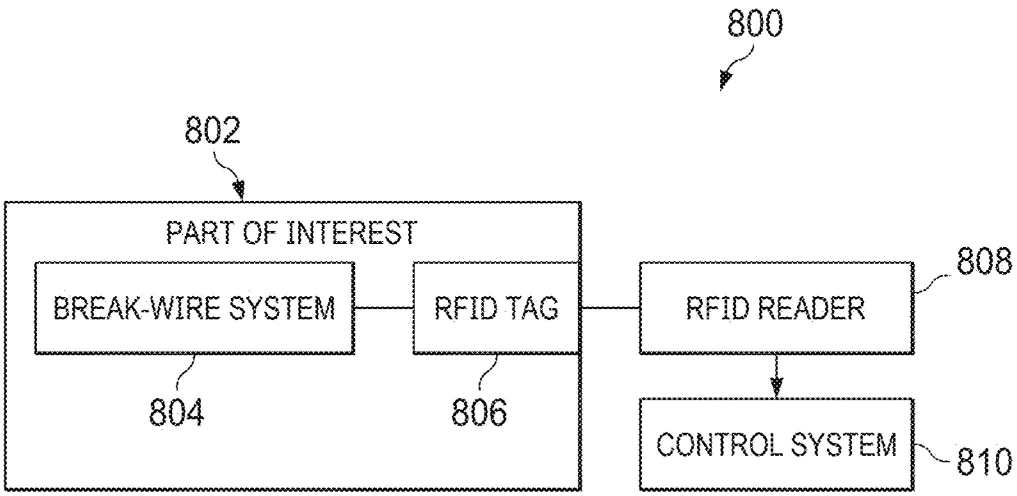
FIG. 8 is a block diagram of a system for detecting damage in an aircraft part in accordance with embodiments described herein.

FIG. 8 is a simplified block diagram of a system 800 for detecting damage in a part of interest 802 (e.g., a planetary pinion gear) of an aircraft, such as a rotorcraft, in accordance with embodiments described herein. As shown in FIG. 8, a break wire system 804 is embedded in part of interest 802 such that upon a failure of the part in accordance with a mode of concern causes one or more wires of break wire system 804 to break. Breaking of the wire(s) of break wire system 804 is signaled by an RFID tag 806 of attached to the part of interest 802 to an RFID reader 808, which may be provided in a location remote from the part of interest. RFID reader 808 may signal the detected defect to a control system 810 of the aircraft.

Figure 9:
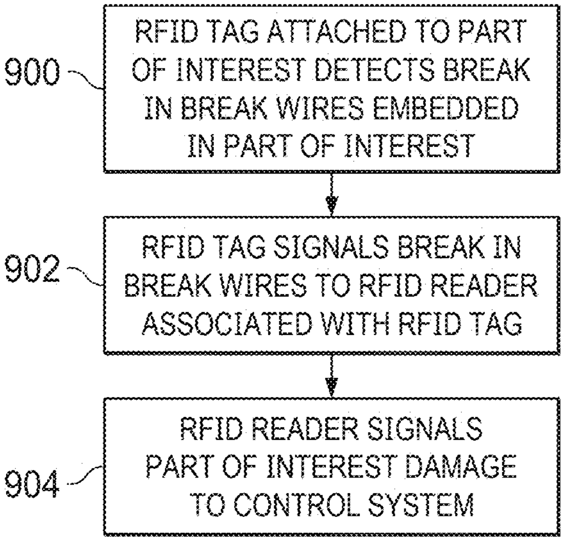
FIG. 9 is a flow diagram showing example operations that may be performed in connection with techniques for detecting damage in an aircraft part in accordance with embodiments described herein.

FIG. 9 is a flow diagram showing example operations that may be performed in connection with techniques for detecting damage in an aircraft part in accordance with embodiments described herein. In operation 900, an RFID tag (e.g., RFID tag 806) attached to a part of interest (e.g., part of interest 802) detects a break in one or more break wires of a break wire system (e.g., break wire system 804) embedded in the part of interest. In operation 902, the RFID tag signals the detected break to an RFID reader (e.g., RFID reader 808) associated with the RFID. In operation 904, RFID reader signals the detected defect/failure to a control system (e.g., control system 810), which may be located on the aircraft or remote from the aircraft.

Although the operations of the example method shown in and described with reference to FIG. 9 are illustrated as occurring once each and in a particular order, it will be recognized that the operations may be performed in any suitable order and repeated as desired. Additionally, one or more operations may be performed in parallel. Furthermore, the operations illustrated in FIG. 9 may be combined or may include more or fewer details than described.

Figure 10:
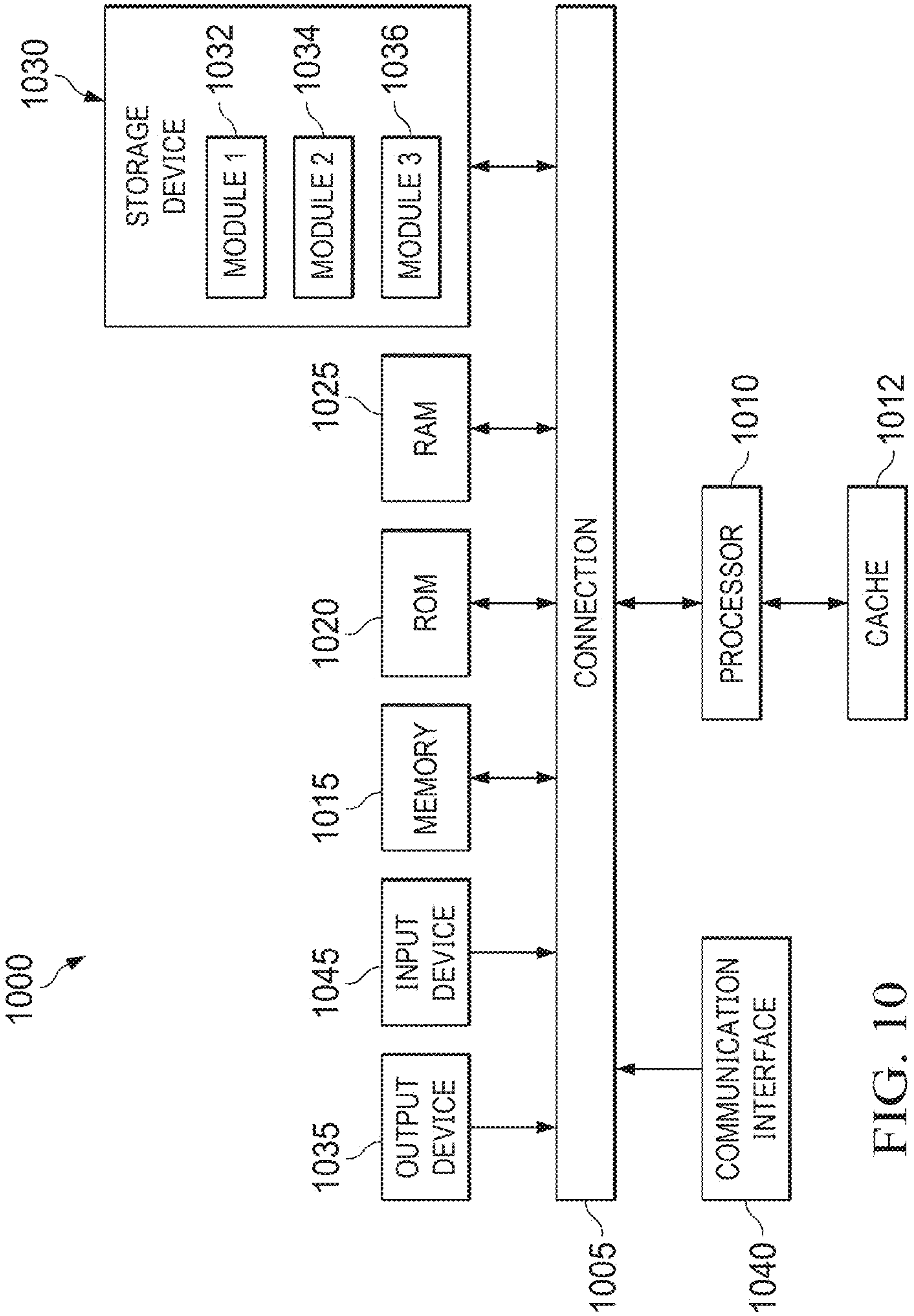
FIG. 10 illustrates an example processor-based system with which some aspects of the embodiments described herein can be implemented.

FIG. 10 illustrates an example processor-based system with which some aspects of embodiments described herein can be implemented. For example, processor-based system 1000 can be any computing device making up, or any component thereof in which the components of the system are in communication with each other using connection 1005. In particular embodiments, system 1000 may comprise all or part of control system 910. Connection 1005 can be a physical connection via a bus, or a direct connection into processor 1010, such as in a chipset architecture. Connection 1005 can also be a virtual connection, networked connection, or logical connection.

In some embodiments, computing system 1000 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 1000 includes at least one processing unit (Central Processing Unit (CPU) or processor) 1010 and connection 1005 that couples various system components including system memory 1015, such as Read-Only Memory (ROM) 1020 and Random-Access Memory (RAM) 1025 to processor 1010. Computing system 1000 can include a cache of high-speed memory 1012 connected directly with, in close proximity to, or integrated as part of processor 1010.

Processor 1010 can include any general purpose processor and a hardware service or software service, such as services 1032, 1034, and 1036 stored in storage device 1030, configured to control processor 1010 as well as a special purpose processor where software instructions are incorporated into the actual processor design. One or more of services 1032, 1034, and 1036 may be involved in implementing one or more operations shown and described herein. Processor 1010 may essentially be a completely self-contained computing system, containing multiple cores or processors, a bus, memory controller, cache, etc. A multi-core processor may be symmetric or asymmetric.

To enable user interaction, computing system 1000 includes an input device 1045, which can represent any number of input mechanisms, such as a microphone for speech, a touch-sensitive screen for gesture or graphical input, keyboard, mouse, motion input, speech, etc. Computing system 1000 can also include output device 1035, which can be one or more of a number of output mechanisms known to those of skill in the art. In some instances, multimodal systems can enable a user to provide multiple types of input/output to communicate with computing system 1000. Computing system 1000 can include communications interface 1040, which can generally govern and manage the user input and system output. The communication interface may perform or facilitate receipt and/or transmission wired or wireless communications via wired and/or wireless transceivers, including those making use of an audio jack/plug, a microphone jack/plug, a USB port/plug, an Apple® Lightning® port/plug, an Ethernet port/plug, a fiber optic port/plug, a proprietary wired port/plug, a Bluetooth® wireless signal transfer, a Bluetooth® low energy (BLE) wireless signal transfer, an IBEACON® wireless signal transfer, a Radio-Frequency Identification (RFID) wireless signal transfer, Near-Field Communications (NFC) wireless signal transfer, Dedicated Short Range Communication (DSRC) wireless signal transfer, 802.11 Wi-Fi® wireless signal transfer, W1AN signal transfer, Visible Light Communication (VLC) signal transfer, Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer signal transfer, ultraviolet light signal transfer, wireless signal transfer along the electromagnetic spectrum, or some combination thereof.

Communication interface 1040 may also include one or more GNSS receivers or transceivers that are used to determine a location of the computing system 1000 based on receipt of one or more signals from one or more satellites associated with one or more GNSS systems. GNSS systems include, but are not limited to, the US-based GPS, the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 1030 can be a non-volatile and/or non-transitory and/or computer-readable memory device and can be a hard disk or other types of computer-readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid state memory, a Compact Disc Read-Only Memory (CD-ROM) optical disc, a rewritable CD optical disc, a Digital Video Disk (DVD) optical disc, a Blu-ray Disc (BD) optical disc, a holographic optical disk, another optical medium, a Secure Digital (SD) card, a micro SD (microSD) card, a Memory Stick® card, a smartcard chip, a EMV chip, a Subscriber Identity Module (SIM) card, a mini/micro/nano/pico SIM card, another Integrated Circuit (IC) chip/card, Random-Access Memory (RAM), Static RAM (SRAM), Dynamic RAM (DRAM), Read-Only Memory (ROM), Programmable ROM (PROM), Erasable PROM (EPROM), Electrically Erasable PROM (EEPROM), flash EPROM (FLASHEPROM), cache memory (L1/L2/L3/L4/L5/L#), Resistive RAM (RRAM/ReRAM), Phase Change Memory (PCM), Spin Transfer Torque RAM (STT-RAM), another memory chip or cartridge, and/or a combination thereof.

Storage device 1030 can include software services, servers, services, etc., that when the code that defines such software is executed by the processor 1010, it causes the system 1000 to perform a function. In some embodiments, a hardware service that performs a particular function can include the software component stored in a computer-readable medium in connection with the necessary hardware components, such as processor 1010, connection 1005, output device 1035, etc., to carry out the function.

Example 1 provides a rotorcraft including a rotor system; and a transmission system for providing rotational power to the rotor system, the transmission system including a housing; and a planetary pinion gear disposed in the housing; and a system for detecting damage to the planetary pinion gear during operation thereof, the system including; a break wire embedded in the planetary pinion gear, the break wire configured to break when a crack develops in the planetary pinion gear; and a radio frequency identification (RFID) tag for indicating breakage of the break wire to an RFID reader.

Example 2 provides the rotorcraft of example 1, in which the RFID tag is attached to or embedded in the planetary pinion gear.

Example 3 provides the rotorcraft of example 1, in which the RFID tag is attached to the break wire.

Example 4 provides the rotorcraft of example 1, in which breakage of the break wire renders the RFID tag inoperable.

Example 5 provides the rotorcraft of example 1, in which the RFID reader is located outside the housing.

Example 6 provides the rotorcraft of example 1, further including a control system for controlling operations of the rotorcraft and in which the RFID reader is configured to provide a signal to the control system indicative of the damage to the planetary pinion gear.

Example 7 provides the rotorcraft of example 1, in which the break wire includes a pair of break wires embedded in the planetary pinion gear around a circumference of the planetary pinion gear and the RFID tag is connected between the pair of break wires.

Example 8 provides a system for detecting an occurrence of a catastrophic failure event in connection with an aircraft part during operation of the aircraft, the system including a break wire embedded in the aircraft part, the break wire configured to break upon the occurrence of the catastrophic failure event; and a radio frequency identification (RFID) tag for indicating breakage of the break wire to an RFID reader.

Example 9 provides the system of example 8, in which the RFID tag is attached to the aircraft part.

Example 10 provides the system of example 8, in which the RFID tag is embedded in the aircraft part.

Example 11 provides the system of example 8, in which the aircraft part is a planetary pinion gear.

Example 12 provides the system of example 8, in which the RFID tag is connected to the break wire.

Example 13 provides the system of example 8, in which breakage of the break wire renders the RFID tag inoperable.

Example 14 provides the system of example 8, in which breakage of the break wire results in the RFID tag transmitting a state change to the RFID reader.

Example 15 provides the system of example 8, in which the RFID reader is located external to a housing in which the aircraft part is disposed.

Example 16 provides the system of example 8, in which the RFID reader is configured to provide a signal to a control system of the aircraft indicative of the catastrophic failure event.

Example 17 provides a method for detecting an occurrence of a catastrophic failure event in connection with an aircraft part disposed within a housing during operation of the aircraft, the method including detecting a rupture of a break wire embedded in the aircraft part, the break wire configured to break upon the occurrence of the catastrophic failure event; and signaling the detected rupture to a system disposed outside of the housing.

Example 18 provides the method of example 17, in which the detecting is performed using a radio frequency identification (RFID) tag.

Example 19 provides the method of example 18, in which the system disposed outside of the housing includes an RFID reader.

Example 20 provides the method of example 19, further including generating an alert regarding the occurrence to a control system of the aircraft.

At least one embodiment is disclosed, and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, RI, and an upper limit, Ru, is disclosed, any number falling within the range is specifically disclosed. In particular, the following numbers within the range are specifically disclosed: R=RI+k*(Ru−RI), wherein k is a variable ranging from 1 percent to 100 percent with a 1 percent increment, i.e., k is 1 percent, 2 percent, 3 percent, 4 percent, 5 percent, . . . 50 percent, 51 percent, 52 percent, . . . , 95 percent, 96 percent, 95 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present invention. The terms "substantially," "close," "approximately," "near," and "about," generally refer to being within +/−5-20% of a target value based on the context of a particular value as described herein or as known in the art. Similarly, terms indicating orientation of various elements, e.g., "coplanar," "perpendicular," "orthogonal," "parallel," or any other angle between the elements, generally refer to being within +/−5-20% of a target value based on the context of a particular value as described herein or as known in the art.

The diagrams in the FIGURES illustrate the architecture, functionality, and/or operation of possible implementations of various embodiments of the present disclosure. Although several embodiments have been illustrated and described in detail, numerous other changes, substitutions, variations, alterations, and/or modifications are possible without departing from the spirit and scope of the present disclosure, as defined by the appended claims. The particular embodiments described herein are illustrative only and may be modified and practiced in different but equivalent manners, as would be apparent to those of ordinary skill in the art having the benefit of the teachings herein. Those of ordinary skill in the art would appreciate that the present disclosure may be readily used as a basis for designing or modifying other embodiments for carrying out the same purposes and/or achieving the same advantages of the embodiments introduced herein. For example, certain embodiments may be implemented using more, less, and/or other components than those described herein. Moreover, in certain embodiments, some components may be implemented separately, consolidated into one or more integrated components, and/or omitted. Similarly, methods associated with certain embodiments may be implemented using more, less, and/or other steps than those described herein, and their steps may be performed in any suitable order.

Numerous other changes, substitutions, variations, alterations, and modifications may be ascertained to one of ordinary skill in the art and it is intended that the present disclosure encompass all such changes, substitutions, variations, alterations, and modifications as falling within the scope of the appended claims.

One or more advantages mentioned herein do not in any way suggest that any one of the embodiments described herein necessarily provides all the described advantages or that all the embodiments of the present disclosure necessarily provide any one of the described advantages. Note that in this specification, references to various features included in "one embodiment", "example embodiment", "an embodiment", "another embodiment", "certain embodiments", "some embodiments", "various embodiments", "other embodiments", "alternative embodiment", and the like are intended to mean that any such features are included in one or more embodiments of the present disclosure but may or may not necessarily be combined in the same embodiments.

As used herein, unless expressly stated to the contrary, use of the phrase "at least one of," "one or more of" and "and/or" are open ended expressions that are both conjunctive and disjunctive in operation for any combination of named elements, conditions, or activities. For example, each of the expressions "at least one of X, Y and Z", "at least one of X, Y or Z", "one or more of X, Y and Z", "one or more of X, Y or Z" and "A, B and/or C" can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z. Additionally, unless expressly stated to the contrary, the terms "first," "second," "third," etc., are intended to distinguish the particular nouns (e.g., blade, rotor, element, device, condition, module, activity, operation, etc.) they modify. Unless expressly stated to the contrary, the use of these terms is not intended to indicate any type of order, rank, importance, temporal sequence, or hierarchy of the modified noun. For example, "first X" and "second X" are intended to designate two X elements that are not necessarily limited by any order, rank, importance, temporal sequence, or hierarchy of the two elements. As referred to herein, "at least one of," "one or more of," and the like can be represented using the "(s)" nomenclature (e.g., one or more element(s)).

In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph (f) of 35 U.S.C. Section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A rotorcraft comprising:

a rotor system; and a transmission system for providing rotational power to the rotor system, the transmission system comprising:

a housing; and a planetary pinion gear disposed in the housing; and a system for detecting damage to the planetary pinion gear during operation thereof, the system comprising;

a break wire embedded in the planetary pinion gear, the break wire configured to break when a crack develops in the planetary pinion gear; and a radio frequency identification (RFID) tag for indicating breakage of the break wire to an RFID reader.

2. The rotorcraft of claim 1, wherein the RFID tag is attached to or embedded in the planetary pinion gear.

3. The rotorcraft of claim 1, wherein the RFID tag is attached to the break wire.

4. The rotorcraft of claim 1, wherein breakage of the break wire renders the RFID tag inoperable.

5. The rotorcraft of claim 1, wherein the RFID reader is located outside the housing.

6. The rotorcraft of claim 1, further comprising a control system for controlling operations of the rotorcraft and wherein the RFID reader is configured to provide a signal to the control system indicative of the damage to the planetary pinion gear.

7. The rotorcraft of claim 1, wherein the break wire comprises a pair of break wires embedded in the planetary pinion gear around a circumference of the planetary pinion gear and the RFID tag is connected between the pair of break wires.

8. A system for detecting an occurrence of a catastrophic failure event in connection with a gear of an aircraft during operation of the aircraft, the system comprising:

a break wire embedded in the gear, the break wire configured to break upon the occurrence of the catastrophic failure event; and a radio frequency identification (RFID) tag for indicating breakage of the break wire to an RFID reader.

9. The system of claim 8, wherein the RFID tag is attached to the gear.

10. The system of claim 8, wherein the RFID tag is embedded in the gear.

11. The system of claim 8, wherein the gear is a planetary pinion gear.

12. The system of claim 8, wherein the RFID tag is connected to the break wire.

13. The system of claim 8, wherein breakage of the break wire renders the RFID tag inoperable.

14. The system of claim 8, wherein breakage of the break wire results in the RFID tag transmitting a state change to the RFID reader.

15. The system of claim 8, wherein the RFID reader is located external to a housing in which the gear is disposed.

16. The system of claim 8, wherein the RFID reader is configured to provide a signal to a control system of the aircraft indicative of the catastrophic failure event.

17. A method for detecting an occurrence of a catastrophic failure event in connection with a planetary pinion gear of an aircraft part-disposed within a housing during operation of the aircraft, the method comprising:

detecting a rupture of a break wire embedded in the planetary pinion gear, the break wire configured to break upon the occurrence of the catastrophic failure event; and signaling the detected rupture to a system disposed outside of the housing.

18. The method of claim 17, wherein the detecting is performed using a radio frequency identification (RFID) tag.

19. The method of claim 18, wherein the system disposed outside of the housing comprises an RFID reader.

20. The method of claim 19, further comprising generating an alert regarding the occurrence to a control system of the aircraft.

* * * * *